(12) United States Patent
Delmar

(10) Patent No.: US 6,472,990 B2
(45) Date of Patent: Oct. 29, 2002

(54) POOL SAFETY LIGHTING SYSTEM

(76) Inventor: Stephen Delmar, 217 N. Ironwood, Gilbert, AZ (US) 85234

( * ) Notice: Subject to any disclaimer, the term of this patent is extended or adjusted under 35 U.S.C. 154(b) by 0 days.

(21) Appl. No.: 09/802,241

(22) Filed: Mar. 8, 2001

(65) Prior Publication Data

US 2002/0126505 A1 Sep. 12, 2002

(51) Int. Cl.$^7$ ................................................. G08B 23/00
(52) U.S. Cl. ..................... 340/573.6; 362/583; 315/363
(58) Field of Search .................. 362/554, 556, 362/583, 559; 340/686, 850, 323 R, 573.6

(56) References Cited

U.S. PATENT DOCUMENTS

| | | | |
|---|---|---|---|
| 3,441,957 A | 4/1969 | Friedman | 240/26 |
| 3,609,343 A | 9/1971 | Howlett | 240/10 |
| 3,749,901 A | 7/1973 | Clough | 240/2 |
| 4,782,430 A | 11/1988 | Robbins | 362/32 |
| 5,067,059 A | 11/1991 | Hwang | 362/101 |
| 5,680,496 A | * 10/1997 | Burkitt et al. | 362/36 |
| 5,691,696 A | * 11/1997 | Mazies et al. | 340/468 |
| 5,825,954 A | * 10/1998 | Dunn et al. | 385/79 |
| 5,980,076 A | 11/1999 | Dunn | 362/562 |
| 6,002,216 A | * 12/1999 | Mateescu | 315/158 |
| 6,144,317 A | * 11/2000 | Sims | 340/815.42 |
| 6,270,244 B1 | * 8/2001 | Naum | 359/238 |

* cited by examiner

Primary Examiner—Sandra O'Shea
Assistant Examiner—John Amarantides
(74) Attorney, Agent, or Firm—LaValle D. Ptak

(57) ABSTRACT

A pool safety lighting system is designed for use in diving swimming pools, in particular, which have a shallow portion connected to a deep portion by an intermediate sloping wall. To reduce the risk of injury for persons diving into the pool, either using a diving board or diving from the edge, colored warning lights are placed in the bottom of the pool, typically with a green light in the deepest portion and a red light at the transition from an intermediate portion to the shallowest portion, with a yellow light located on the intermediate rising portion between the deep part of the pool and the shallowest part. The light delivery system ideally is a fiber optic cable system supplying light to fiber optic cables terminating in the bottom of the pool and supplied with light from a source remote from the pool.

14 Claims, 2 Drawing Sheets

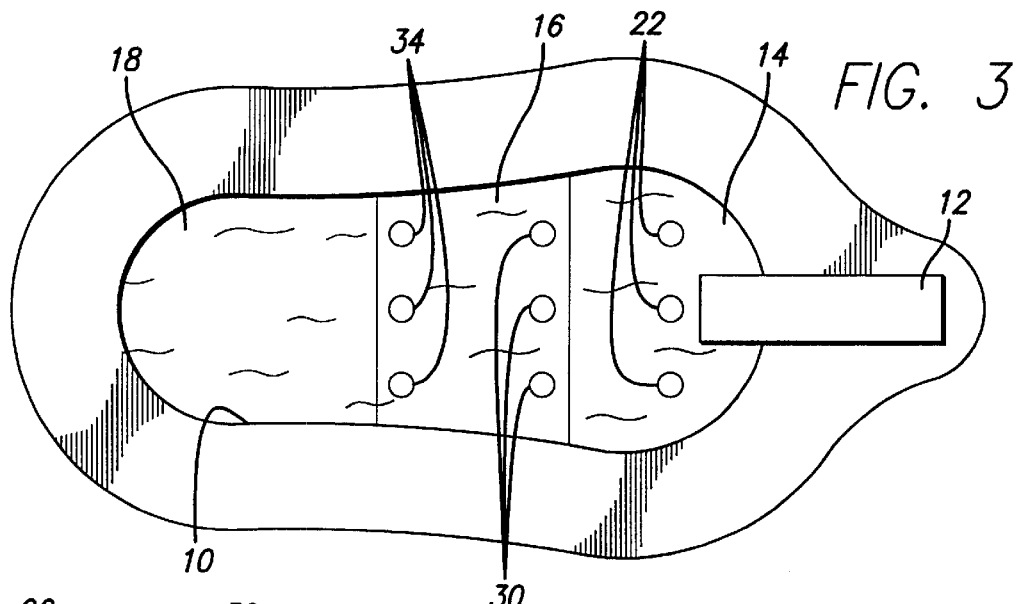
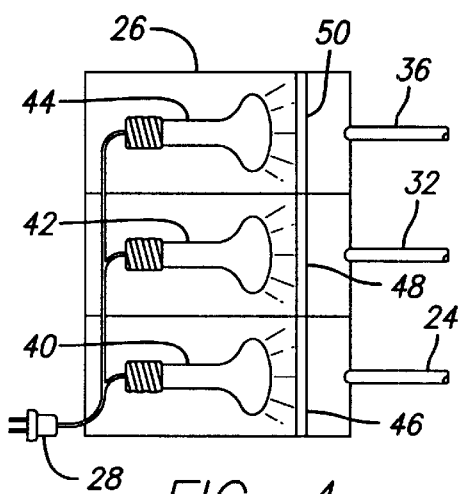
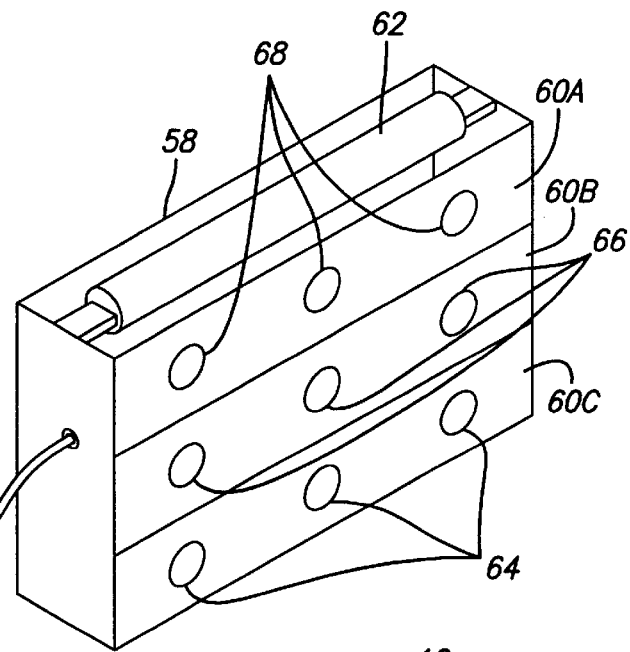
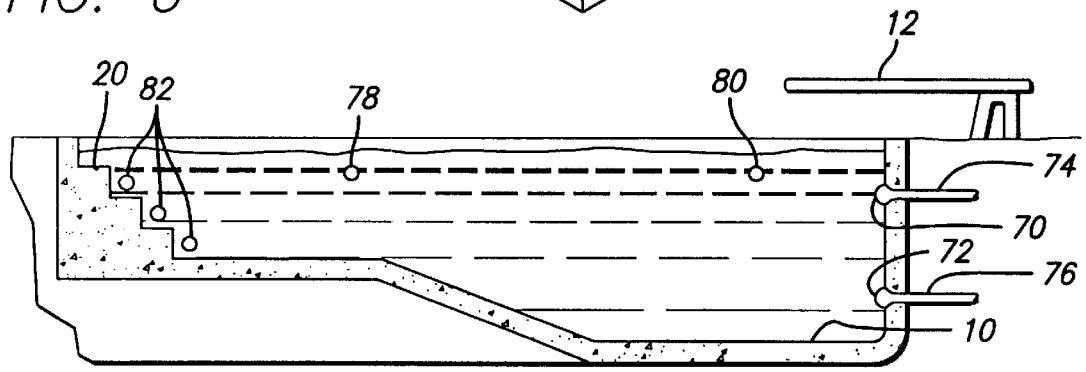

POOL SAFETY LIGHTING SYSTEM

BACKGROUND

Swimming pools are in widespread use throughout the world for recreational use. In many parts of the world, including the southern United States, many homeowners have private swimming pools located in their backyards. In addition, parks, recreational facilities, country clubs and the like also frequently have relatively large public swimming pools.

In most cases, swimming pools, whether small or large, are designed with a shallow end connected by means of a sloping transition to a deep end of the pool. The deep end typically is designed to be between eight and ten feet deep; so that persons may dive into that end of the pool. Diving boards are often located at the deep end of such swimming pools. For smaller pools, the deep portion does not extend a great distance before it transitions upwardly into the shallow portion of the pool. Even for larger pools, divers cannot easily distinguish, from the diving board, the transition from the deepest water to the shallowest water with any great amount of accuracy. As a consequence, persons diving into the pool, either off a diving board or from the sides of the pool, risk colliding with the bottom of the pool if the dive is targeted toward the shallow end of the pool, or toward the transition portion of the pool. This is especially a problem with swimmers using a pool at night.

For many years, swimming pools have included an underwater light located on the vertical wall of the pool, at the deep end, for illuminating the pool. In most pools, this light source is an electric light source connected by means of wires to a source of power. A lens is provided in the wall of the pool between the light bulb and the water on the opposite side of the lens, with appropriate gaskets and seals to prevent water from leaking into the box or housing in which the light bulb is located. In time, however, the gaskets or seals around the lens often deteriorate, allowing water to leak into the lamp housing. This presents a serious potential electrical shock hazard for persons using pools with such lighting systems.

In order to avoid the dangers of a possible electrical hazard from an underwater light source in a pool, systems have been designed to deliver light to a single outlet in a pool from a remotely located light source. Two United States patents showing such systems are Friedman U.S. Pat. No. 3,441,947 and Robbins U.S. Pat. No. 4,782,430. The systems of both of these patents employ the use of a rather large light conduit in the form of a fiber optic cable to deliver light to a single outlet in the pool, from a single remotely located electrical light source. Since the fiber optic cable is used to deliver the actual light to the pool, the possibility of an electrical hazard in the pool is eliminated.

The United States patent to Dunn No. 5,980,076 discloses the light input end of a system for delivering light to a bundle of fiber optic cables (three of which are shown) to termination points in spas or pools. The actual termination points are not shown in this patent; but fiber optic cables are used to deliver light from a remote source to terminating ends of the cables located in a pool or spa.

None of the foregoing patents, however, suggest in any way a warning system for warning divers about to use the pool of the relative depths of the water in the pool. It is desirable to provide a lighting system for a swimming pool which utilizes lights of different colors in the bottom of the pool to warn divers of the different relative depths of the water in the pool.

SUMMARY OF THE INVENTION

It is an object of this invention to provide an improved pool lighting system.

It is another object of this invention to provide an improved swimming pool safety lighting system.

It is an additional object of this invention to provide an improved swimming pool safety lighting system using lights of different colors indicative of different depths of water in the pool.

It is a further object of this invention to provide a swimming pool safety light system utilizing fiber optic cables to deliver light from a remote light source to termination points in the bottom of the pool, with the termination points delivering light of different colors indicative of the relative depth of water in the pool.

In accordance with a preferred embodiment of this invention, a pool safety lighting system for use in a swimming pool having at least a shallow portion and a deep portion utilizes at least first and second lights. The first and second lights are located in the bottom of the swimming pool, and they may be of different colors to advise divers of the relative safety of diving into the pool in the vicinity of the lights. In a more specific embodiment of the invention, the actual light is delivered from a remote light source by way of fiber optic cables to the locations in the bottom of the pool.

BRIEF DESCRIPTION OF THE DRAWINGS

FIG. 3 is a top view of a variation of the embodiment shown in FIGS. 1 and 2;

FIG. 4 shows a detail of a feature of the embodiment of FIG. 1;

FIG. 5 is a detail of a feature of the embodiment shown in FIG. 3; and

FIG. 6 is a cross-sectional diagrammatic representation of another embodiment of the invention.

DETAILED DESCRIPTION

Figure 1:
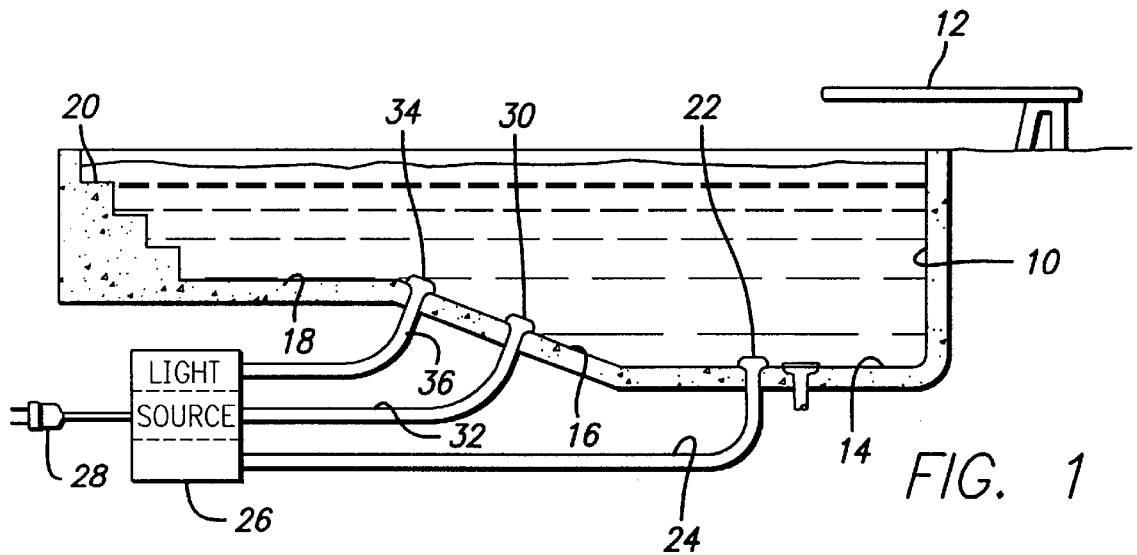
FIG. 1 is a cross-sectional diagrammatic view of a preferred embodiment of the invention.

Reference now should be made to the drawings, in which the same reference numbers are used throughout the different figures to designate the same or similar components. FIG. 1 is a cross-sectional view representative of a typical swimming pool 10. The pool 10 is filled with water and has a deep end 14 connected by an intermediate sloping floor 16 to a shallow end 18. The shallow end typically has a set of steps 20 located in it to permit easy entrance and egress from the pool. It should be noted that the diagrammatic representation in FIG. 1 is not proportionally accurate, but merely is selected to illustrate the various sections or depths of typical swimming pools. The pool of FIG. 1 frequently has a diving board 12 located at the deep end. The board 12 terminates over the deepest part of the pool, as is readily apparent from an examination of the drawings, especially FIG. 1.

To warn divers and other users of the pool as to the relative depth of the water, and therefore the relative safety of diving into the pool, light outputs 22, 30 and 34 are provided along the longitudinal center line of the pool, at different pool depths, as is readily apparent from FIG. 1. These light outputs ideally are lenses on the termination ends of three respective fiber optic cables 24, 32 and 36, as illustrated in FIG. 1. The input ends of the cables 24, 32 and 36 are coupled to a housing 26. The housing 26 contains either a single light source or three separate light bulbs 40, 42 and 44, as illustrated in FIG. 4, for illuminating the input ends of the fiber optic cables 24, 32 and 36.

In order for the lights formed by the lenses or output ends 22, 30 and 34 of the fiber optic cables to serve as warning lights, the light sources 40, 42 and 44 are lamps of different colors. In the alternative, a single lamp or three lamps as shown in FIG. 4 may be used to illuminate respective colored lenses 46, 48 and 50 located between the electric lamps (light bulbs) and the ends of the cables 24, 32 and 36 to cause light of different colors to illuminate the input ends of the cables. As illustrated in FIGS. 1 and 4, electric power for operating the lamps is obtained from a suitable source of electrical power, represented in the drawings as the electrical plug 28.

To obtain a pattern of warning lights which is readily recognized and easily remembered, the light produced at the output 22 in the deepest part of the pool is selected to be green, the same color as the "go" signal of a traffic signal light. At the break between the intermediate portion 16 of the pool and the shallow portion 18 of the pool bottom, the light 34 in the bottom of the pool is selected to be red, while the light 30 intermediate the lights 22 and 34 is selected to be of amber or yellow color. Thus, all three of the different lights 22, 30 and 34 are representative of the similar warning lights of a traffic light signal where the green light indicates everything is safe or "go", the intermediate yellow light 30 indicates that caution is necessary; and the red light 34 indicates that this is a danger area, or "stop".

Since these are the colors which are preferred and which are so readily recognized by persons from all parts of the world, the safety warning communicated to a person on the diving board 12 is that it is okay or safe to dive toward the region of the pool in the vicinity of the light 22; it may or may not be safe to dive toward the region of the pool in the vicinity of the light 30; and it is unsafe to dive toward the region of the pool in the vicinity of the light 34. The warning lights are selected to have appropriate brightness, so that they can be seen in daylight as well as at night. Thus, the intensity of the light projected by the bulbs 40, 42 and 44 through the lenses 46, 48 and 50 is selected in accordance with the desired lumen output at the fiber optic cable terminations 22, 30 and 34 in the bottom of the pool.

Figure 2:
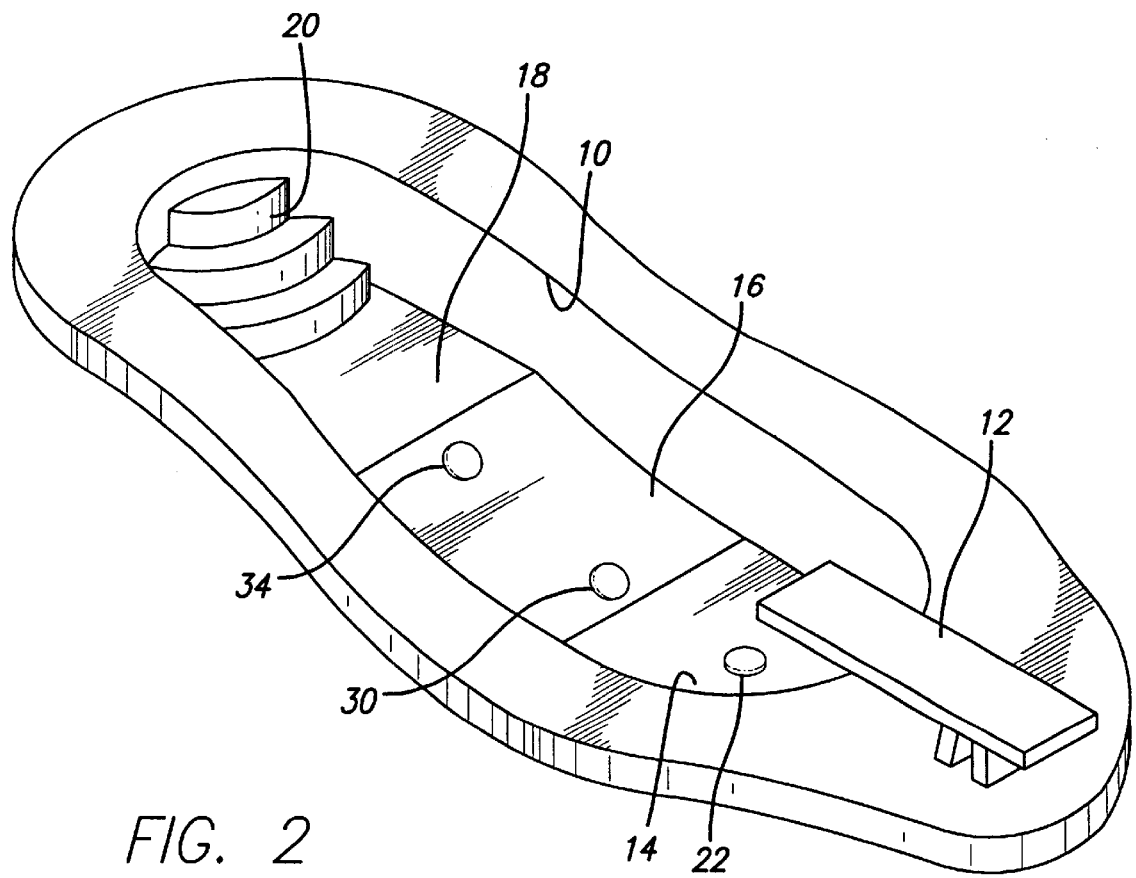
FIG. 2 is a top perspective view of the embodiment shown in FIG. 1.

FIG. 3 illustrates a variation of the embodiment shown in FIGS. 1 and 2, in which multiple sets of light outputs 22, 30 and 34 are provided in transverse lines across the width of the pool in place of the single light outputs 22, 30 and 34 shown in FIGS. 1 and 2. In all other respects, the operation of the system shown in FIG. 3 is identical to the one described above in conjunction with FIGS. 1 and 2. For providing light at the input end of the fiber optic cables connected to the lenses or termination points 22, 30 and 34 in the embodiment of FIG. 3, a lamp housing of the type shown in FIG. 5 may be employed. Here, the housing is shown as including three fluorescent bulbs (only the top one 62 of which is shown), each located in a different part of the housing 58 in sections 60A, 60B and 60C, respectively. The bottommost section 60C corresponds to the bottom section of the embodiment shown in FIG. 4 and includes three circular openings 64 for the input ends of corresponding fiber optic cables 24 connected, respectively, to each of the output lenses 22 in the bottom of the pool of FIG. 3. Similarly, the section 60B includes three openings 66, which are connected to three fiber optic cables 32, which terminate in the lenses 30 of FIG. 3; and the section 60A includes openings 68 which are connected to the input ends of three fiber optic cables 36 connected, respectively, to the three different termination lenses 34 in the bottom of the pool of FIG. 3. The light outputs 30 in the intermediate section 16 are selected to be yellow, while the light outputs 34 at the break between the sections 16 and 18 of the pool are selected to be red, as in the case of the embodiment described above in conjunction with FIGS. 1 and 2.

FIG. 6 illustrates an additional feature which may be incorporated, either along with the safety features described above in conjunction with the embodiments of FIGS. 1 through 5, or independently of the safety lighting system. In FIG. 6, the pool 10 is illustrated as having a plurality of fiber optic termination lenses or outputs 70, 72, 78, 80 and 82 placed at different locations in the pool walls or adjacent the steps 20. The light output from these different lenses or termination ends of fiber optic cables, such as the cables 74 and 76 which are shown in FIG. 6, may be white light or various colored lights for decorative purposes, as desired. The source of light for the lenses or termination ends of the optic cables 72, 74, 78, 80 and 82 may be a single light source illuminating the input ends of a bundle of cables, or multiple light sources of the type shown in FIGS. 4 and 5. The selection of the light sources, the color of the lights, or the lenses, such as the lenses 46, 48 and 50, is discretionary and is a matter of design choice for the particular purpose desired and the effect desired for the pool illumination.

The foregoing description of the preferred embodiment of the invention should be considered as illustrative and not as limiting. Various changes and modifications will occur to those skilled in the art for performing substantially the same function, in substantially the same way, to achieve substantially the same result without departing from the true scope of the invention as defined in the appended claims.

What is claimed is:

1. A safety lighting system for warning divers of the different relative depths of water in a swimming pool having at least a shallow portion and a deep portion, the safety lighting system including in combination:
   at least first and second lights of different colors located in the bottom of a swimming pool at different water depths to indicate to divers the relative safety and dangers of diving into the pool in the vicinity of the lights as a function of the specific colors of the lights.

2. The safety lighting system according to claim 1 wherein the first light is located in a deep portion and the second light is located at or near a shallow portion of the pool.

3. The pool safety lighting system according to claim 2 wherein the first light is green and the second light is red.

4. The safety lighting system according to claim 3 further including at least a third light of a color different from each of the first and second lights, the third light located in the bottom of a pool in a transition region between a deep portion of the pool and a shallow portion of the pool.

5. The safety lighting system according to claim 4 wherein the third light is a yellow light.

6. A safety lighting system according to claim 5 further including an electrical light source remotely located from the pool and wherein the lights for location in the bottom of a swimming pool comprise output ends of different fiber optic cables, the input ends of which are connected to receive light from the electrical light source.

7. The safety lighting system according to claim 6 wherein a common light source is coupled to the input ends of the different fiber optic cables through different colored filters to cause the output ends of the cables in the bottom of a swimming pool to deliver light of different colors corresponding to the colors of the filters.

8. The safety lighting system according to claim 1 further including a plurality of first lights and a plurality of second lights located on respective parallel lines across the width of a swimming pool.

9. A safety lighting system according to claim 1 further including an electrical light source remotely located from the pool and wherein the lights for location in the bottom of a swimming pool comprise output ends of different fiber optic cables, the input ends of which are connected to receive light from the electrical light source.

10. The safety lighting system according to claim 9 wherein a common light source is coupled to the input ends of the different fiber optic cables through different colored filters to cause the output ends of the cables in the bottom of a swimming pool to deliver light of different colors corresponding to the colors of the filters.

11. The safety lighting system according to claim 10 wherein the first light is located in a deep portion and the second light is located at or near a shallow portion of the pool.

12. The pool safety lighting system according to claim 11 wherein the first light is green and the second light is red.

13. The safety lighting system according to claim 1 further including at least a third light of a color different from each of the first and second lights, the third light located in the bottom of a pool in a transition region between a deep portion of the pool and a shallow portion of the pool.

14. The safety lighting system according to claim 9 wherein the light sources connected to the input ends of the fiber optic cables are of different colors.

* * * * *